US012795331B2

(12) United States Patent
MacIntosh

(10) Patent No.: US 12,795,331 B2
(45) Date of Patent: Nov. 10, 2026

(54) ANTI-CIRCUMVENTION FEATURE FOR SECURITY OF WIRELESS FINDING DEVICE

(71) Applicant: Google LLC, Mountain View, CA (US)

(72) Inventor: Eric Allan MacIntosh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 219 days.

(21) Appl. No.: 18/845,322

(22) PCT Filed: Jun. 17, 2022

(86) PCT No.: PCT/US2022/033990

§ 371 (c)(1),
(2) Date: Sep. 9, 2024

(87) PCT Pub. No.: WO2023/244243

PCT Pub. Date: Dec. 21, 2023

(65) Prior Publication Data

US 2025/0184691 A1 Jun. 5, 2025

(51) Int. Cl.
*H04W 4/029* (2018.01)
*G06F 21/88* (2013.01)

(52) U.S. Cl.
CPC ............ *H04W 4/029* (2018.02); *G06F 21/88* (2013.01)

(58) Field of Classification Search
CPC ....... H04W 4/029; G06F 21/88; G06F 21/577
USPC ....................................................... 455/456.1
See application file for complete search history.

(56) References Cited

U.S. PATENT DOCUMENTS

| | | | | |
|---|---|---|---|---|
| 8,514,070 | B2 | 8/2013 | Roper et al. | |
| 2010/0090826 | A1 | 4/2010 | Moran et al. | |
| 2013/0102284 | A1 * | 4/2013 | Storozuk | H04M 19/04 455/411 |

(Continued)

FOREIGN PATENT DOCUMENTS

| | | |
|---|---|---|
| WO | 2023244243 | 12/2023 |

OTHER PUBLICATIONS

"Google is working on automatic smart tag detection for Android", https://www.gsmarena.com/google_working_on_automatic_smart_tag_detection_for_android-news-53777.php#:~:text=Google%20is%20working%20on%20automatic%20tracker%20detection%20for%20Android.,your%20phone%20for%20prolonged%20time., Mar. 30, 2022, 2 pages.

(Continued)

*Primary Examiner* — Don N Vo
(74) *Attorney, Agent, or Firm* — Colby Nipper PLLC

(57) ABSTRACT

The technology generally relates to preventing unwanted tracking using wireless finding devices. For example, wireless finding devices may contain one or more protection features to prevent improper use or unwanted tracking. The wireless finding device may monitor the voltage and current waveforms applied at and/or to the notification mechanism to determine if the notification mechanism has been tampered with. If the wireless finding device determines that the notification mechanism has been tampered with, the wireless finding device may activate a protection feature inhibiting tracking of the wireless finding device. For example, in response to determining the output device has been tampered with and/or failed, the wireless finding device may disable or degrade tracking. Disabling and/or degrading the tracking of the wireless finding device may prevent unwanted tracking.

20 Claims, 8 Drawing Sheets

(56) References Cited

U.S. PATENT DOCUMENTS

| | | | | |
|---|---|---|---|---|
| 2017/0193718 | A1* | 7/2017 | Jones-Mcfadden | G07C 9/28 |
| 2017/0286692 | A1* | 10/2017 | Nakajima | G06F 21/57 |
| 2018/0184286 | A1* | 6/2018 | Patterson | H04W 12/02 |
| 2018/0343561 | A1 | 11/2018 | Patterson | |

OTHER PUBLICATIONS

"International Search Report and Written Opinion", Application No. PCT/US2022/033990, Jan. 31, 2023, 13 pages.
"Foreign Office Action", IN Application No. 202447038273, Jan. 7, 2026, 7 pages.
"International Preliminary Report on Patentability", Application No. PCT/US2022/033990, Dec. 10, 2024, 9 pages.

* cited by examiner

ANTI-CIRCUMVENTION FEATURE FOR SECURITY OF WIRELESS FINDING DEVICE

RELATED APPLICATION(S)

This application is a national stage entry of International Application No. PCT/US2022/033990, filed Jun. 17, 2022, the disclosure of which is incorporated herein by reference in its entirety.

BACKGROUND

Wireless finding devices are typically paired with a host device that indicates the location of the wireless finding device. The host device executes an application to locate the wireless finding device. The application can cause the host to transmit a request to the wireless finding device, in response to which the wireless finding device outputs a signal indicating its location. The host can display the location of the wireless finding device, such as on a map.

Typically, wireless finding devices emit a notification, such as an audible or haptic notification, after being separated from the host device for more than a predetermined period of time and/or when the host device is actively seeking the location of the wireless finding device. The emission of a notification alerts people to the presence of the wireless finding device. In some instances, bad actors can use wireless finding devices for unwanted tracking of objects or people. For example, a bad actor can tamper with a notification mechanism of the wireless finding device such that the device does not emit a notification. The tracking by the bad actor may, therefore, be unknown to the person being tracked.

BRIEF SUMMARY

The technology generally relates to preventing unwanted tracking using wireless finding devices. For example, a protection feature may be implemented in wireless finding devices, such as keytags or cards with signal transmitters for location identification by an application. The protection feature may prevent improper use or unwanted tracking by detecting when a notification mechanism, that ordinarily provides an audible, visible, or other notification that the device is actively being tracked, has been compromised. Further, the protection feature disables or degrades tracking in response to such detection of a compromised notification mechanism. Detecting that the notification mechanism of the wireless finding device has been compromised includes monitoring, by the wireless finding device, a voltage applied to and/or current flowing through the notification mechanism to determine if the notification mechanism has been tampered with. Based on variations in monitored voltage or current, the wireless finding device determines that the notification mechanism has been tampered with. In response, the wireless finding device inhibits tracking of the wireless finding device, such as by disabling or degrading tracking, thereby preventing unwanted tracking.

One aspect of the technology is directed to a wireless finding device comprising a notification mechanism, a battery, and one or more processors. The one or more processors may be configured to detect at least one of a voltage applied by the battery to the notification mechanism or a current flowing through the notification mechanism from the battery, compare the detected voltage or current to an expected voltage or current associated with proper functioning of the notification mechanism, and activate, based on a variation between the detected voltage or current and the expected voltage or current, a protection feature inhibiting tracking of the wireless finding device. The protection features may include disabling tracking of the wireless finding device or degrading tracking performance of the wireless finding device.

The wireless finding device may further comprise a communications interface adapted for direct or indirect communication with a host device, wherein in response to activating the protection feature, the communications interface is configured to transmit a notification to the host device. The notification may be an alert that the notification mechanism has been removed, disconnected, plugged, or occluded. In some examples, after transmitting the notification, a tracking status of the wireless finding device cannot be changed. In response to activating the protection feature, the communications interface may further be configured to transmit a request for information to re-enable tracking.

The notification mechanism may be at least one of a speaker, a light, a piezoelectric buzzer, haptics actuator, or a magnetic buzzer. The wireless finding device may further comprise a memory configured to store an expected voltage or current waveform associated with the proper functioning of the notification mechanism, wherein comparing the detected voltage or current to the expected voltage or current includes comparing at least one of a shape or amplitude of a detected voltage or current waveform to the expected voltage or current waveform.

Another aspect of the technology is generally directed to a method comprising: detecting, by one or more processors, at least one of a voltage applied by a battery to a notification mechanism in a wireless finding device or a current flowing through the notification mechanism in the wireless finding device from the battery, comparing, by the one or more processors, the detected voltage or current to an expected voltage or current associated with proper functioning of the notification mechanism, and activating, by the one or more processors based on a variation between the detected voltage or current and the expected voltage or current, a protection feature inhibiting tracking of the wireless finding device.

Yet another aspect of the technology is generally directed to a non-transitory computer-readable storage medium storing instructions, which when executed by one or more processors, cause the one or more processors to: detect at least one of a voltage applied by a battery to a notification mechanism of a wireless finding device or a current flowing through the notification mechanism of the wireless finding device from the battery, compare the detected voltage or current to an expected voltage or current associated with proper functioning of the notification mechanism, and activate, based on a variation between the detected voltage or current and the expected voltage or current, a protection feature inhibiting tracking of the wireless finding device.

DETAILED DESCRIPTION

The present disclosure provides a system and method for preventing unwanted or unknown tracking by a bad actor using a wireless finding device. The wireless finding device includes a notification mechanism that alerts a user to the presence of the wireless finding device, such as by emitting an audible, visible, haptic, or other notification. The wireless finding device further includes a protection feature which detects when the notification mechanism has been compromised and inhibits tracking in response, such as by disabling or degrading tracking. For example, the wireless finding device may monitor the voltage applied to the notification mechanism. In some examples, the wireless finding device may, additionally or alternatively, monitor the current flowing through the notification mechanism. The wireless finding device may monitor the voltage or current by detecting the respective voltage or current waveforms, and comparing the detected waveforms with expected waveforms corresponding to a properly functioning device. If the detected voltage or current waveforms vary from the expected waveforms, as discussed further below in connection with FIGS. 4A-4D, the wireless finding device may determine that the notification mechanism has been tampered with or has otherwise failed. Tampering with the notification mechanism may include physical removal of a notification mechanism, disconnecting circuitry for the notification mechanism, occlusion of the notification mechanism, damaging of the notification mechanism, etc. If the wireless finding device determines that the notification mechanism has been tampered with or has otherwise failed, the wireless finding device activates a protection feature inhibiting tracking of the wireless finding device. For example, the protection feature may be a change in the tracking status of the wireless finding device. Changing the tracking status may include, for example, changing the tracking status from "tracking" to "tracking disabled" or "tracking degraded."

Changing the tracking status of the wireless finding device in response to determining that the notification mechanism has been tampered with may prevent unwanted finding, monitoring, and/or tracking of people or objects. For example, a bad actor may tamper with the notification mechanism of the wireless finding device in an effort to find the location of another person without the other person being notified of the presence of the wireless finding device. By activating the protection feature in response to a determination that the notification mechanism of the wireless finding device has been tampered with, the bad actor would not be able to find the location of the other person as the tracking features of the wireless finding device would be disabled or degraded. This may prevent a bad actor from using the wireless finding device in a malicious fashion, and protects the other person from unwanted or unknown tracking.

Figure 1:
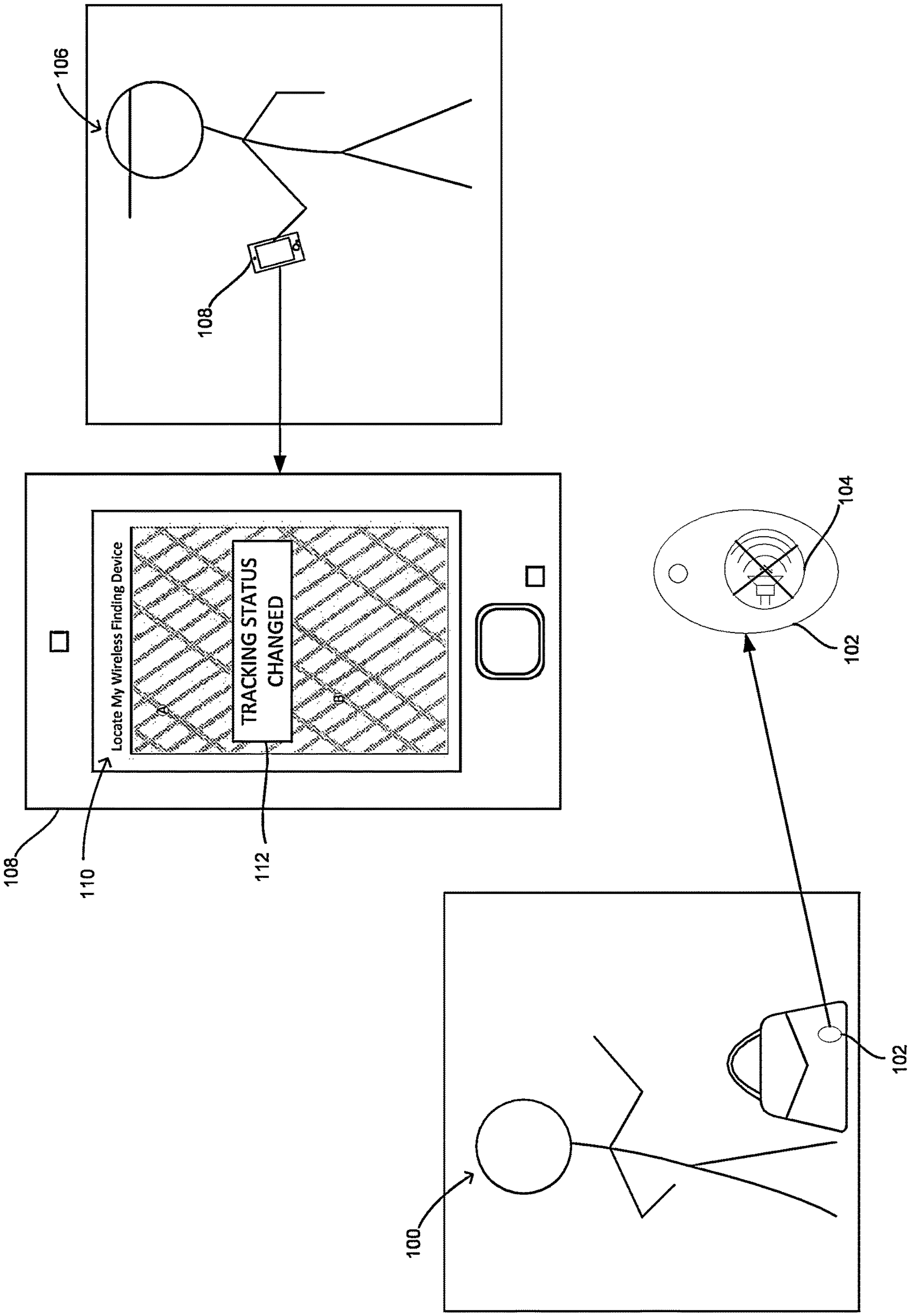
FIG. 1 is a pictorial diagram of an example of unwanted tracking in accordance with aspects of the disclosure.

FIG. 1 illustrates an example of unwanted tracking that is detected and prevented using a protection feature described herein. For example, bad actor 106 may pair wireless finding device 102 with a host device 108. Host device 108 may execute an application to locate the wireless finding device 102. The wireless finding device 102 may typically output a notification when the application transmits a request to locate the wireless finding device or when wireless finding device 102 has been separated from host device 108 for a predetermined amount of time. However, the bad actor 106 may have tampered with the notification mechanism of the wireless finding device 102, such that it no longer emits a notification, prior to planting the wireless finding device 102 on person 100 unbeknownst to person 100. In this regard, bad actor 106 may intend to track a location of the person 100 without the person's knowledge. However, the protection feature of the wireless finding device will detect the tampering with the notification mechanism, and activate a protection response. Such protection response may include, for example, disabling or degrading a tracking feature of the wireless finding device 102.

As shown, host device 108 is a smart phone. However host device 108 may be, for example, a desktop computer, laptop, tablet, smartwatch, smart glasses, home assistant device such as an assistant hub, smart display, audio playback device, etc., AR/VR headset, smart helmet, or any of a variety of other computing devices. During the unboxing experience, the wireless finding device 102 may be paired with the host device 108 such that the host device 108 receives notifications regarding the location of the wireless finding device. According to some examples, the host device 108 may be associated with an account used to locate the wireless finding device 102. In some examples, the account may be associated with application 110. The account may be associated with a user name and password. In some examples, the account may include identification information regarding the user of the wireless finding device 102. The identification information may be, for example, fingerprint authentication, facial recognition, a predetermined passcode, or other information associated with the user of wireless finding device 102.

The wireless finding device 102 may be, for example, a keytag or card with signal transmitters for location identification by an application. Wireless finding device 102 may include a notification mechanism 104, such as a speaker, light, piezo-electric buzzer, magnetic buzzer, haptics actuator, or other notification mechanism. The notification mechanism 104 may output an audible, visual, and/or haptic notification. For example, the wireless finding device 102 may output a notification, such as an audible, visual, and/or haptic notification, if the wireless finding device 102 determines that the wireless finding device 102 has not received a beacon response from the host device 108 after a predetermined time. In yet another example, the notification mechanism 104 may output a notification when wireless finding device 102 receives a request to locate wireless finding device 102.

In detecting the tampering with the notification mechanism, according to one example, the wireless finding device 102 may apply a test signal to the notification mechanism 104. For example, the test signal may be an audible test signal or it may be outside an audible range. The test signal may apply a voltage to the notification mechanism 104, or it may send a current through the notification mechanism 104. The wireless finding device 102 may monitor the voltage or current waveforms at or near the time the test signal is applied to the notification mechanism 104. The wireless finding device 102 may compare the detected waveform to an expected waveform associated with a properly functioning notification mechanism. If the detected waveform does not substantially correspond to the expected waveform associated with the properly functioning notification mechanism, wireless finding device 102 may determine that the notification mechanism 104 has been compromised.

According to another example, detecting the tampering with the notification mechanism may include monitoring, by the wireless finding device, the voltage applied across the notification mechanism 104 at or near the time the wireless finding device 102 outputs a notification. Additionally or alternatively, wireless finding device 102 may monitor the current flowing through the notification mechanism at or near the time the wireless finding device outputs the notification. Monitoring the voltage applied or the current flowing through may include, for example, detecting the voltage waveforms or the current waveforms at the time the wireless finding device 102 outputs a notification. The wireless finding device 102 may compare the detected waveform to a waveform of a properly functioning notification mechanism. If the detected waveform does not substantially correspond to the expected waveform associated with properly functioning notification mechanism, wireless finding device 102 may determine that the notification mechanism 104 has been compromised.

According to some examples, in detecting tampering with the notification mechanism, the wireless finding device 102 may include a microphone that can detect whether the notification mechanism 104 outputs an audio notification. For example, the microphone may detect audio output from the notification mechanism 104 at or near the time the wireless finding device 102 outputs a notification. The wireless finding device 102 may compare the detected audio output to audio output of a properly functioning notification mechanism 104. If the detected audio output does not substantially correspond to the expected audio output associated with a properly functioning notification mechanism, wireless finding device 102 may determine that the notification mechanism 104 has been compromised.

In some examples, in detecting tampering with the notification mechanism 104, the wireless finding device 102 may include an accelerometer. The accelerometer may detect movement of the wireless finding device 102 at or near the time the wireless finding device 102 outputs a notification. The wireless finding device 102 may compare the detected movement to movement of a properly functioning notification mechanism 104. If the detected movement does not substantially correspond to the expected movement associated with a properly functioning notification mechanism, wireless finding device 102 may determine that the notification mechanism 104 has been compromised.

According to another example, the wireless finding device 102 may include a photosensor. In such an example, detecting the tampering with the notification mechanism may include detecting, by the photosensor of the wireless finding device 102, the light output by the notification mechanism 104. The wireless finding device 102 may compare the detected light to the light output of a properly functioning notification mechanism. If the detected light output does not substantially correspond to the expected light output associated with a properly functioning notification mechanism, wireless finding device 102 may determine that the notification mechanism 104 has been compromised.

After the wireless finding device 102 determines that the notification mechanism 104 has been compromised, the wireless finding device 102 activates a protection feature inhibiting the tracking of the wireless finding device 102. For example, the protection feature may change a tracking status of the wireless finding device 102. The tracking status may be changed, for example, from "tracking" to "disabled tracking" or "degraded tracking."

Disabled tracking may be, for example, when wireless finding device 102 stops transmitting a broadcast message. According to some examples, disabled tracking may be when wireless finding device 102 stops providing its location to a server or network associated with application 110. The broadcast message may include a unique identifier for wireless finding device 102. When the wireless finding device is properly functioning, such that the protection feature has not been activated, a host device within range of the broadcast message may receive the broadcast message and transmit a response to the network acknowledging the presence of wireless finding device. The network may use the response to help locate the wireless finding device. For example, the location of the host device transmitting the response may be used to identify the location of wireless finding device without providing information pertaining to the host device. In such an example, the response sent from the host device to the network may include location information for the host device. The network may use the location information of the host device as a location where the wireless finding device was last acknowledged by a host device. According to some examples, when the paired host device indicates that the wireless finding device has been lost, the network may provide the last-known location, based on the location information of other host devices, to the paired host device.

Degraded tracking may include, for example, updating the location of the wireless finding device 102 less frequently as compared to a properly functioning wireless finding device 102 that has not been compromised. According to some examples, degraded tracking may include transmitting fewer broadcast messages.

According to some examples, after activating the protection feature to inhibit tracking of wireless finding device 102, wireless finding device 102 may transmit a notification 112 to host device 108. In yet another example, when host device 108 executes an application 110 to locate wireless finding device 102, the application 110 may provide a notification 112. In yet another example, after activating the protection feature, bad actor 106 may not receive a notification.

The notification 112 may indicate that the tracking status of the wireless finding device 102 has been changed. The notification 112 may alert bad actor 106 that the protection feature has been activated such that the tracking of the wireless finding device 102 has been disabled or degraded. For example, the notification 112 may indicate the change in the tracking status from tracking to disabled or degraded tracking. According to some examples, the notification 112 may be an alert that the notification mechanism has been removed, disconnected, plugged, or occluded.

According to some examples, when the tracking status has been changed to tracking disabled or tracking degraded, tracking may not be re-enabled. In such an example, the host device 108 may receive a notification that the tracking status has been disabled and cannot be re-enabled. This may prevent the bad actor 106 from being able to improperly use the wireless finding device 102 to track person 100.

Figure 2:
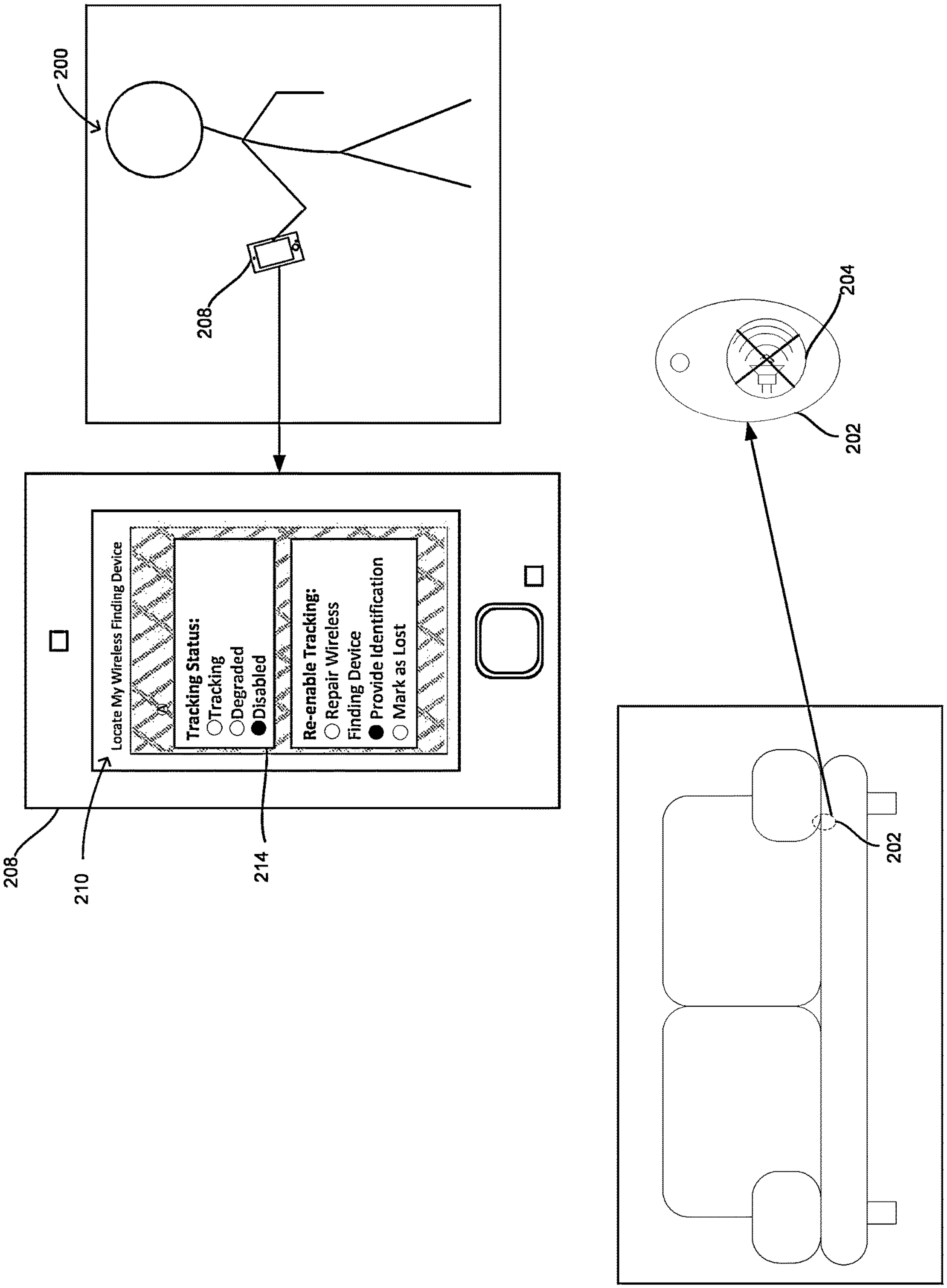
FIG. 2 is a pictorial diagram of an example user interface in accordance with aspects of the disclosure.

FIG. 2 illustrates an example of re-enabling tracking after the protection feature is activated. In some instances, the wireless finding device may be properly used by a knowing person, but detect that it has been compromised. For example, a user 200 may have the wireless finding device attached to their keys. If their keys are stuffed between couch cushions, the wireless finding device 202 may detect that its notification mechanism 204 has been occluded and therefore activate the protection feature. After the protection feature has been activated, application 210 may provide additional information 214 regarding the activated protection feature.

The additional information 214 may be an indication of the change in tracking status, a way to re-enable tracking of wireless finding device 202, etc. According to some examples, the additional information 214 may indicate that the tracking of wireless finding device 202 has been disabled. According to some examples, application 210 may allow user 200 to re-enable tracking of wireless finding device 202.

In some examples, application 210 used to locate wireless finding device 202 may require proof of identification prior to re-enabling tracking of the wireless finding device 202. In this regard, the application may confirm that the user is the owner of the wireless finding device and is properly using it, as opposed to being a bad actor improperly using the wireless finding device. Proof of identification may include, for example, username and password, or any other identification information, such as providing a photo or scan of government issued identification. In further examples, the user may have to authenticate their identity before tracking is re-enabled. Such authentication may request, for example, fingerprint authentication, facial recognition, a predetermined passcode, or other information that only the proper user should have.

In yet another example, the application 210 may re-enable tracking of the wireless finding device 202 after the host device 208 is within a predetermined distance of the wireless finding device 202. For example, a user may have the wireless finding device attached to their backpack. If the wireless finding device is damaged from squeezed between books in the backpack, the wireless finding device may detect that its notification mechanism has been damaged and therefore activate the protection feature. After the protection feature has been activated, the host device 108 may re-pair with wireless finding device 202 when the host device 108 is within the predetermined distance of wireless finding device 202. In some examples, when host device 108 is within the predetermined distance, host device 208 may transmit a response to the broadcast transmitted by wireless finding device 202. After receiving the response from host device 208, wireless finding device 202 may re-enable tracking.

Example System

Figure 3:
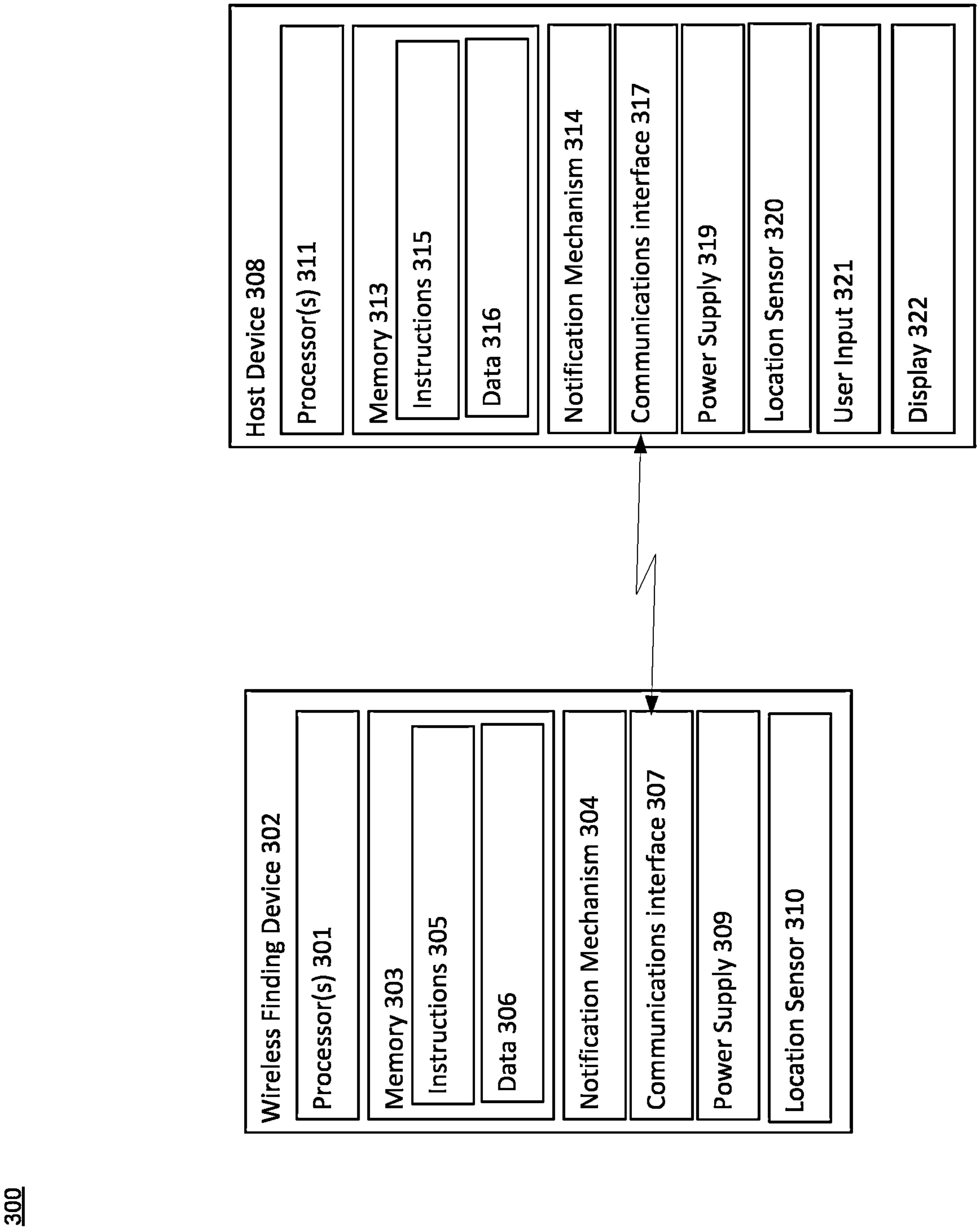
FIG. 3 is a functional diagram of an example system in accordance with aspects of the disclosure.

FIG. 3 illustrates an example system 300 in which the features described above and herein may be implemented. It should not be considered limiting the scope of the disclosure or usefulness of the features described herein. In this example, system 300 may include a wireless finding device 302 and a host device 308. While FIG. 3 shows a single wireless finding device 302 connected to a single host device 308, system 300 may include one or more wireless finding devices 302 connected to one or more host devices 308. Thus, a system 300 with only one wireless finding device 302 and one host device 308 is merely an example and is not intended to be limited.

Wireless finding device 302 may include one or more processors 301, memory 303, instructions 305, data 306, notification mechanism(s) 304, communication interface 307, power supply 309, and location sensor 310.

Memory 303 may store information that is accessible by processor 301. Memory 303 may also include data that can be retrieved, manipulated or stored by the processor 301. The memory 303 may be of any non-transitory type capable of storing information accessible by the processor 301, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 303 may store information that is accessible by the processors 301, including instructions 305 that may be executed by processors 301, and data 306.

Data 306 may be retrieved, stored or modified by processors 301 in accordance with instructions 305. For instance, although the present disclosure is not limited by a particular data structure, the data 306 may be stored in computer registers, in a relational database as a table having a plurality of different fields and records, XML documents, or flat files. The data 306 may also be formatted in a computer-readable format such as, but not limited to, binary values, ASCII or Unicode. By further way of example only, the data 306 may comprise information sufficient to identify the relevant information, such as numbers, descriptive text, proprietary codes, pointers, references to data stored in other memories (including other network locations) or information that is used by a function to calculate the relevant data.

The instructions 305 can be any set of instructions to be executed directly, such as machine code, or indirectly, such as scripts, by the processor 301. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 301 may include any conventional processors, such as a commercially available CPU or microprocessor. Alternatively, the processor can be a dedicated component such as an ASIC or other hardware-based processor. Although not necessary, wireless finding device 302 may include specialized hardware components to perform specific computing functions faster or more efficiently.

Although FIG. 3 functionally illustrates the processor, memory, and other elements of wireless finding device 302 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the wireless finding device 302. Accordingly, references to a processor or computing device will be understood to include references to a collection of processors or computing devices or memories that may or may not operate in parallel.

Wireless finding device 302 may further include a notification mechanism 304. The processors 301 may monitor the voltage applied to the notification mechanism 304. Additionally or alternatively, processors 301 may monitor the current flowing through the notification mechanism 304. Monitoring the voltage and current may include, for example, monitoring the voltage waveform and current waveform when a test signal is applied to the notification mechanism 304. According to some examples, monitoring the voltage and current may include monitoring the voltage and current waveforms at or near the time notification mechanism 304 outputs a notification.

Figure 4A:
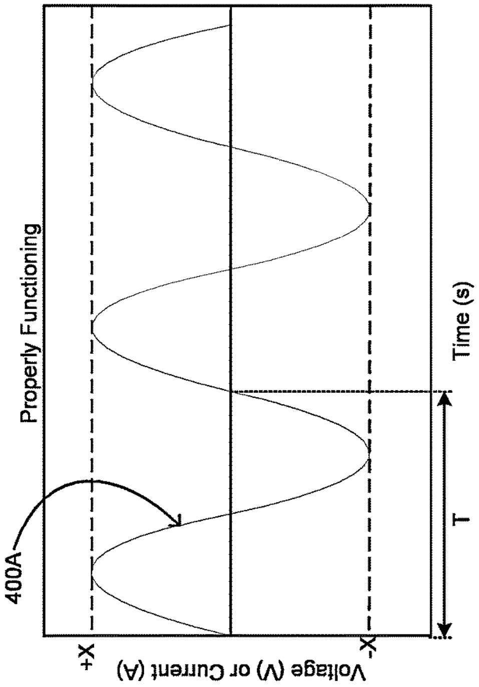
FIGS. 4A-4D are example voltage and current waveforms in accordance with aspects of the disclosure.
Figure 4B:
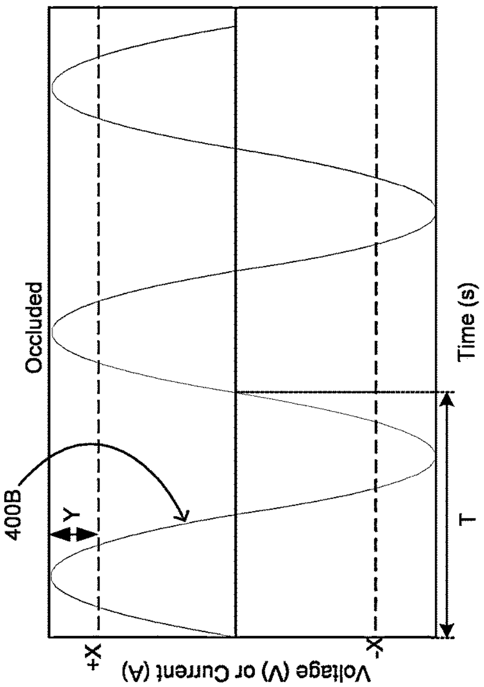
Figure 4C:
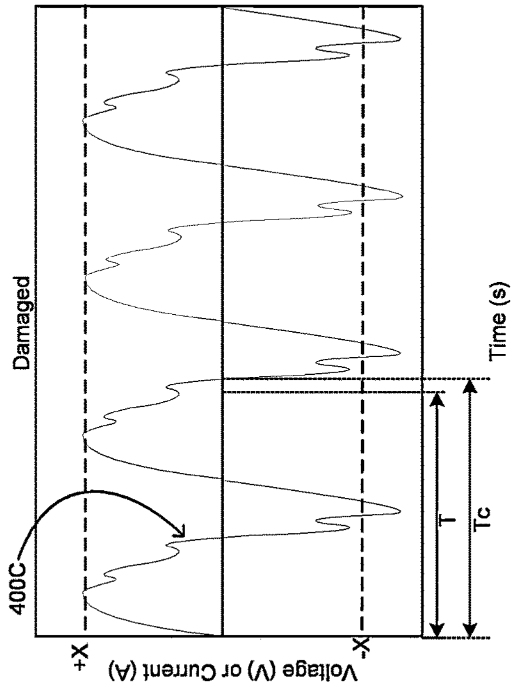
Figure 4D:
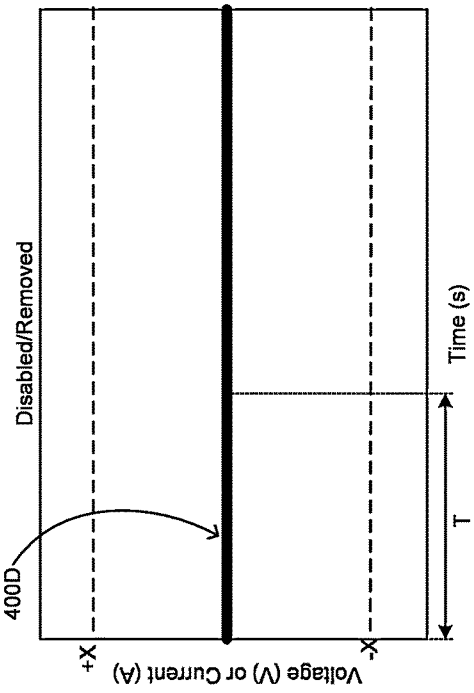

FIG. 4A illustrates an example waveform 400A of a properly functioning notification mechanism 304. The waveform 400A may represent, voltage, current, or some combination of voltage and current. The voltage or current of a properly functioning notification mechanism 304 may be in the form of a sine wave with an amplitude of +/−X and a period "T". While shown as a sine wave, the waveforms may be a square wave, sawtooth wave, cosine wave, etc.

In examples where notification mechanism 304 has been occluded, the voltage and current waveforms 400B may be different than the voltage and current waveform 400A of a properly functioning notification mechanism. An occluded notification mechanism 304 may be, for example, where the vibration mechanism or audio output mechanism has been dampened such that the notification mechanism 304 cannot vibrate or produce audio. In some examples, an occluded notification mechanism 304 may be a notification mechanism that has been covered up by tape or glue. The amplitude of the voltage and current waveform 400B of an occluded notification mechanism 304 may be greater by a value "Y" than the amplitude of a properly functioning notification mechanism. The difference in amplitude may indicate that notification mechanism 304 has been tampered with.

In examples where notification mechanism 304 has been damaged, the voltage and current waveforms 400C may be different than the voltage and current waveform 400A of a properly functioning notification mechanism. For example, a damaged notification mechanism 304 may produce a waveform 400C which has a shape that generally corresponds to a properly functioning waveform 400A but may have a different amplitude or period. In some examples, the shape of waveform 400C may generally correspond to waveform 400A, but may include additional peaks and valleys. For example, waveform 400C of a damaged notification mechanism may not be a smooth sine wave but, instead, may include peaks and valleys along the sine wave.

In examples where notification mechanism 304 has been disabled or removed, the voltage and current waveforms 400D may be different than the voltage and current waveform 400A of a properly functioning notification mechanism. For example, a notification mechanism 304 that has been disabled or removed may not have any voltage applied to it or current flowing through it. Waveform 400D may be, in such an example, a flat line indicating 0 Volts and/or 0 Amps.

The processors 301 may compare the current or voltage waveforms 400B-D to the current or voltage waveform 400A of a properly functioning notification mechanism 304 to determine whether the notification mechanism 304 has been tampered with. If waveforms 400B-D do not correspond or do not substantially correspond to waveform 400A, the wireless finding device 302 may determine that the notification mechanism 304 has been tampered with.

Wireless finding device 302 may include a communications interface 307, such as an antenna, transceiver, and any other devices used for wireless communication. The wireless finding device 302 may be configured for communicative coupling to host device 308 via a wireless connection and/or communication link, such as Bluetooth, short-range wireless pairing, 4G, 5G, or 6G communications, etc.

Communications interface 307 may transmit a broadcast message to be received by one or more devices. Communications interface 307 may receive a response to the broadcast message. The response may be an acknowledgement of the presence of wireless finding device 302. For example, the host device 308 may respond to the broadcast such that the wireless finding device 302 determines it is within a predefined radius of host device 308

Wireless finding device 302 may include a power supply 309. The power supply 309 may be, for example, a battery. In some examples, the power supply 309 may be rechargeable. Power supply 309 may apply a voltage to and/or have current through notification mechanism 304.

Wireless finding device 302 may further include a location sensor 310. Location sensor 310 may provide a rough indication as to the location of wireless finding device 302. According to some examples, the location sensor 310 may be GPS sensors. In some examples, the processors 301 may aggregate information from the location sensor 310 and the location of the device(s) transmitting the response message to determine the location of wireless finding device 302. The communications interface 307 may transmit the location to a server and/or a network such that an application connected to the server and/or network can provide an indication of the location of the wireless finding device 302.

Host device 308 may include one or more components that are substantially similar to those described herein with respect to wireless finding device 302, such as one or more processors 311, memory 313, instructions 315, data 316, notification mechanism 314, communications interface 317, power supply 319, and location sensor 320. Host device may further include user input 321 and display 322. User input 321 may be, for example, a touch pad or microphone. In some examples, display 322 may be a touch screen capable of receiving user input. Display 322 may output a user interface associated with identifying the location of wireless finding device 302.

A user may use host device 308 to locate wireless finding device 302. For example, the host device 308 may execute an application or a website associated with the wireless finding device 302 to identify the location of wireless finding device 302. According to some examples, a user may use a touch screen, such as display 322, to input a request to locate wireless finding device 302. Additionally or alternatively, a user may use voice commands to input a request to locate wireless finding device 302.

In response to the request, the application may provide an indication on a map of the location of wireless finding device 302. In some examples, the application may send a request to wireless finding device 302 to output a notification to assist the user in finding wireless finding device 302.

Example Use Case

Figure 5A:
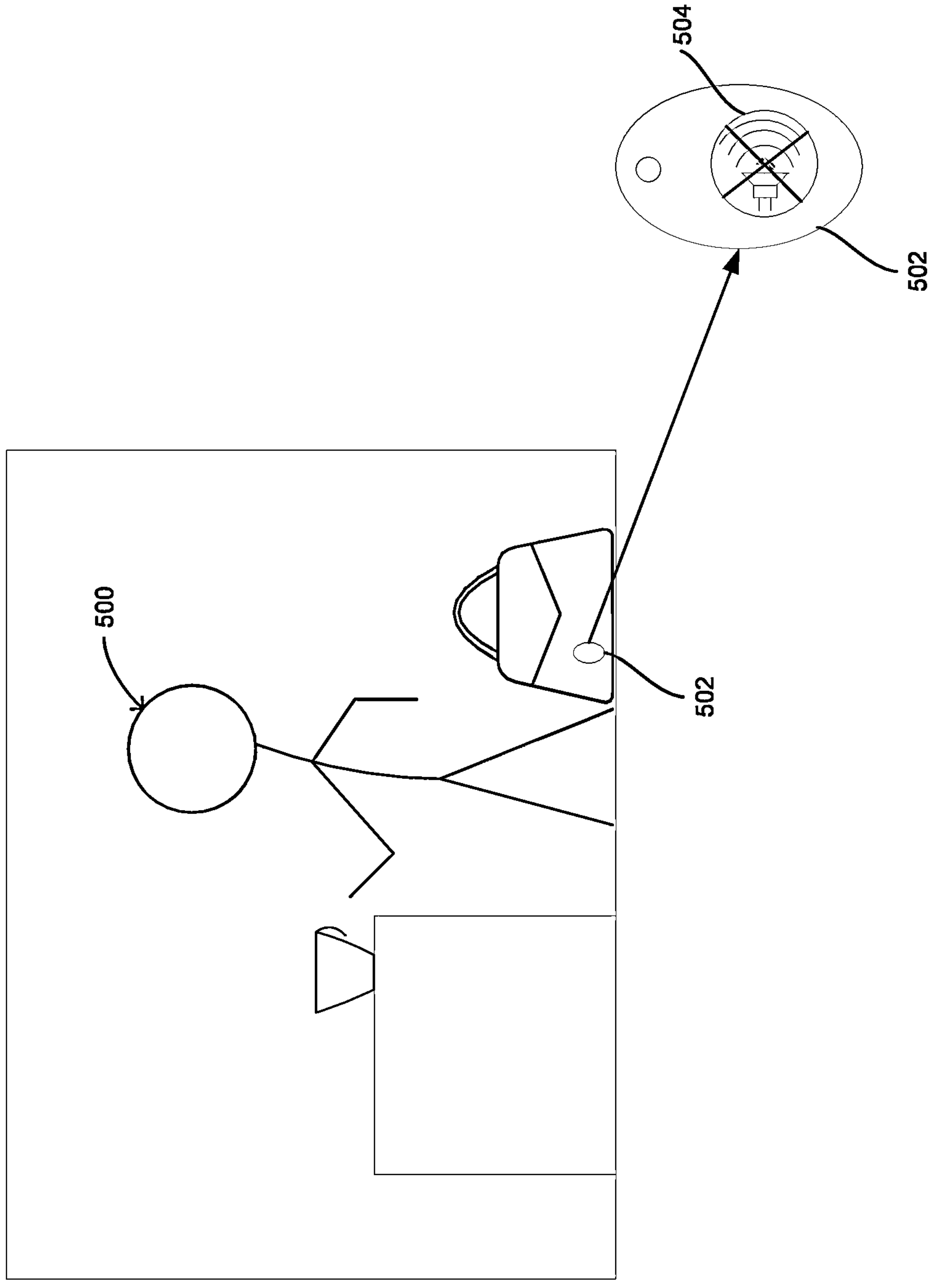
FIG. 5A is a pictorial diagram of an example of unwanted tracking in accordance with aspects of the disclosure.

FIGS. 5A-5D illustrate an example use of a wireless finding device activating a protection feature to inhibit tracking of the wireless finding device. As illustrated in FIG. 5A, bad actor 556 may have placed a wireless finding device 502 in the handbag of person 500. Typically, notification mechanism 504 of wireless finding device 502 would output a notification to alert person 500 of its presence after wireless finding device 502 has been separated from host device 558 for a predetermined period of time. However, bad actor 556 may have tampered with the notification mechanism 504 of wireless finding device 502 such that person 500 would not be alerted to the presence of wireless finding device 502. Bad actor 556 may attempt to use wireless finding device 502 to track person 500 without person 500 knowing.

Figure 5B:
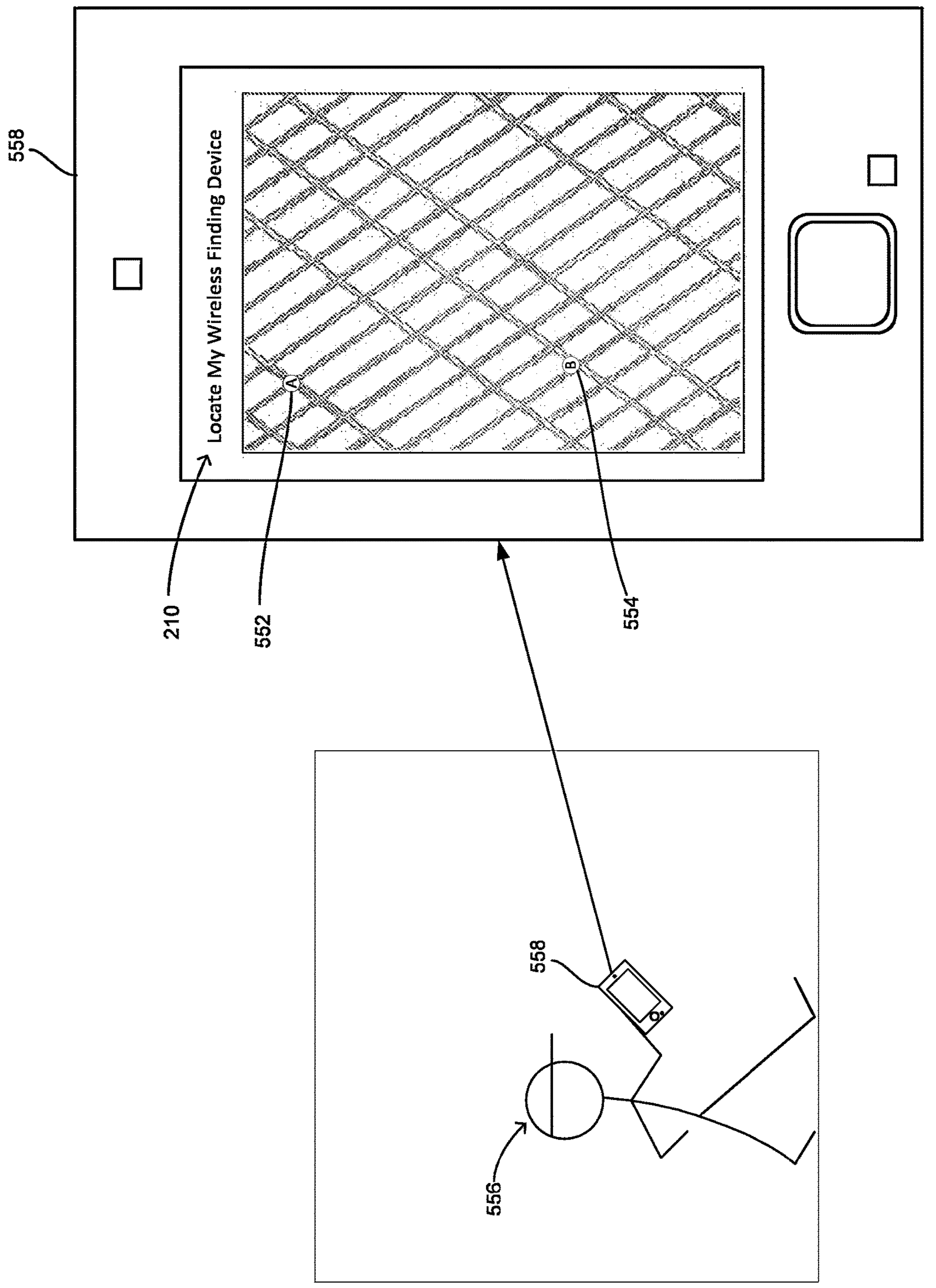
FIGS. 5B-5D are pictorial diagrams of example user interfaces in accordance with aspects of the disclosure.

FIG. 5B illustrates bad actor 556 using host device 558, paired with the wireless finding device 502, to attempt to locate wireless finding device 502. According to some examples, wireless finding device 502 may be associated with an account used to access application 550. Host device 558 may be used to open application 550 for locating wireless finding device 502. As shown in FIG. 5B, application 550 may indicate the current location "A" 552 of bad actor 556 and the location "B" 554 of wireless finding device 502.

Wireless finding device 502 may determine that notification mechanism 504 has been compromised. For example, wireless finding device 502 may monitor the voltage waveform when a voltage is applied to notification mechanism 504, such as when a test signal is applied to notification mechanism 504 or at the time notification mechanism 504 attempts to output a notification. Wireless finding device 502 may, additionally or alternatively, monitor the current waveform when current is flowing through notification mechanism 504, such as when the test signal is applied or at the time a notification is output by notification mechanism 504. Wireless finding device 502 may compare the detected voltage and current waveforms to a corresponding waveform of a properly functioning wireless finding device. In examples where the detected waveforms do not correspond to the waveforms of a properly functioning notification mechanism, the wireless finding device 502 may determine that the notification mechanism 504 has been tampered with.

In examples where the wireless finding device 502 determines that the notification mechanism 504 has been compromised, wireless finding device 502 may activate a protection feature inhibiting tracking of the wireless finding device 502. For example, the wireless finding device 502 may change its tracking status from tracking to disabled tracking or degraded tracking. A degradation in tracking performance may include, for example, updating the location of the wireless finding device 502 less frequently as compared to a wireless finding device 502 with a properly functioning notification mechanism 504.

In response to determining that the notification mechanism 504 has been tampered with, wireless finding device 502 may transmit a notification 562 to a host device 558 indicating the activation of the protection feature. For some embodiments, the communication of the notification can be direct if the paired host device is sufficiently close, while being indirect by means of a centrally governed or confederated finding network of host devices if farther away, the latter indirect communication being configured, either intrinsically or via an appropriately designed protocol of the finding network, to be devoid of any location information perceivable by the user of the paired host device. As shown in FIG. 5C, the notification 562 may be an indication that the tracking status of wireless finding device 502 has changed. In some examples, application 550 associated with identifying the location of the wireless finding device 502 may provide a notification 562 in response to bad actor 556 trying to locate wireless finding device 502 via application 550.

Figure 5D:
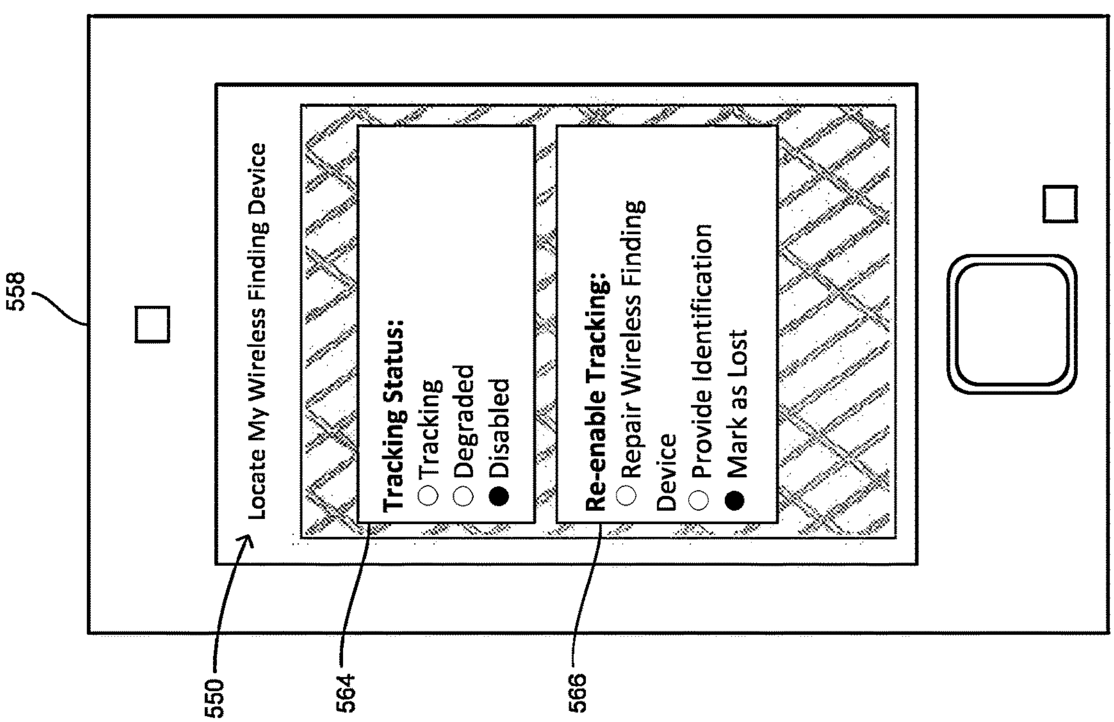
Figure 5C:
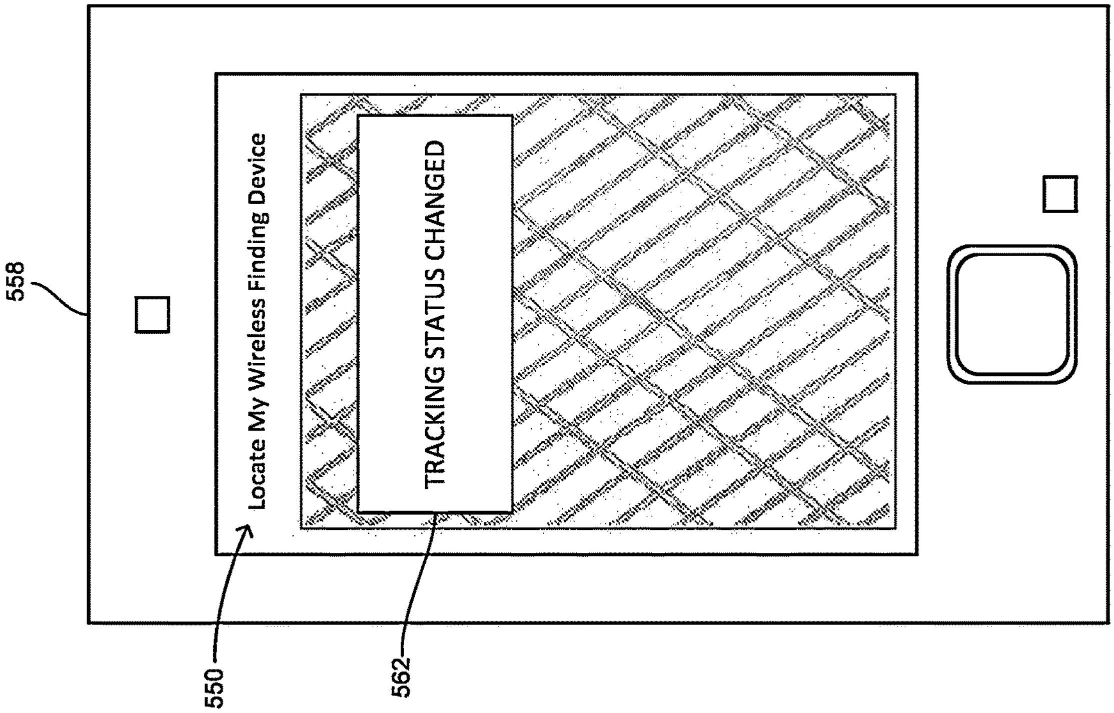

FIG. 5D illustrates an example user interface providing additional details regarding the change in tracking status. For example, after application 550 provides a notification 562 that the tracking status has changed, application 550 may provide information regarding the updated, or changed, tracking status 564. The tracking status 564 of wireless finding device 502 may be indicated by a selection of a radio button next to the tracking status of tracking, degraded, disabled. In some examples, the tracking status 564 may be indicated based on a toggle or check box. Therefore, while a radio button is shown to indicate the tracking status 564, radio buttons are merely one example and are not intended to be limiting.

The tracking status 564 of wireless finding device 502 may be, for example, "tracking." "degraded," or "disabled." When the tracking status 564 of wireless finding device 502 is indicated as tracking, application 550 may provide an indication of the location of wireless finding device 502. When the tracking status 564 is indicated as degraded, application 550 may update the location of wireless finding device 502 less frequently as compared to when the tracking status is tracking. When the tracking status 564 is indicated as disabled, application 550 may not provide an indication of the location of wireless finding device 502.

According to some examples, when the tracking status 564 of wireless finding device 502 is changed to degraded or disabled, application 550 may provide information for re-enabling tracking 566. In some examples, application 550 may provide information for re-enabling tracking 566 in response to a user input to change the tracking status from degraded or disabled to tracking.

To re-enable tracking 566, a user may provide an input to select one of the options to re-enable tracking 566. For example, the application 550 may offer various options for re-enabling tracking of the wireless finding device, such as re-pairing the wireless finding device 502, providing identification, or marking the wireless finding device 502 as lost. In some examples, application 550 may indicate that the tracking of wireless finding device 502 cannot be re-enabled.

Re-pairing the wireless finding device with the host device 558 may occur once host device 558 is within a predetermined distance of the wireless finding device 502. For example, re-repairing of the wireless finding device 502 and the host device 558 may occur when host device 558 is within the predetermined distance of wireless finding device 502 such that the host device 558 can respond to the broadcast from wireless finding device 502.

Providing information may include, for example, bad actor 556 authenticating bad actor's 556 identity. For example, if bad actor 556 selects "provide identification" as a way to re-enable tracking 566, application 550 may provide another screen asking for the bad actor 556 to input information pertaining to their identity. The information may be, in some examples, information associated with the wireless device 502. For example, the information may be associated with the account associated with wireless device 502. In some examples, the information may be a user name, password, fingerprint, facial recognition, predetermined passcode, government identification, etc. The application 550 may compare the information provided by the user to the information associated with the wireless finding device 502. In some examples, the application 550 may compare the information provided by the user to the information associated with the account associated with wireless finding device 502. If the information provided by the user matches the information associated with the wireless finding device 502 or the account associated with wireless finding device 502, application 550 may re-enable tracking of wireless finding device 502.

Marking the wireless finding device 502 as lost may disable tracking of wireless finding device 502. A user may mark the wireless finding device 502 as lost when user is unable to locate wireless finding device 502 using the application and user is unaware of where wireless finding device 502 may be. In some examples, a user may mark the wireless finding device 502 as lost when an attempt to locate the wireless finding device 502 fails. According to some examples, tracking of wireless finding device 502 may remain disabled until wireless finding device 502 is re-paired with host device 558, such as when host device 558 is within a predetermined distance of wireless finding device.

According to some examples, when the tracking status has been changed to tracking disabled or tracking degraded, the tracking may not be re-enabled. In such an example, the host device may receive a notification that the tracking status has been disabled and cannot be re-enabled. This may prevent the user of the host device from being able to improperly use the wireless finding device to track another user/or object.

Example Method

Figure 6:
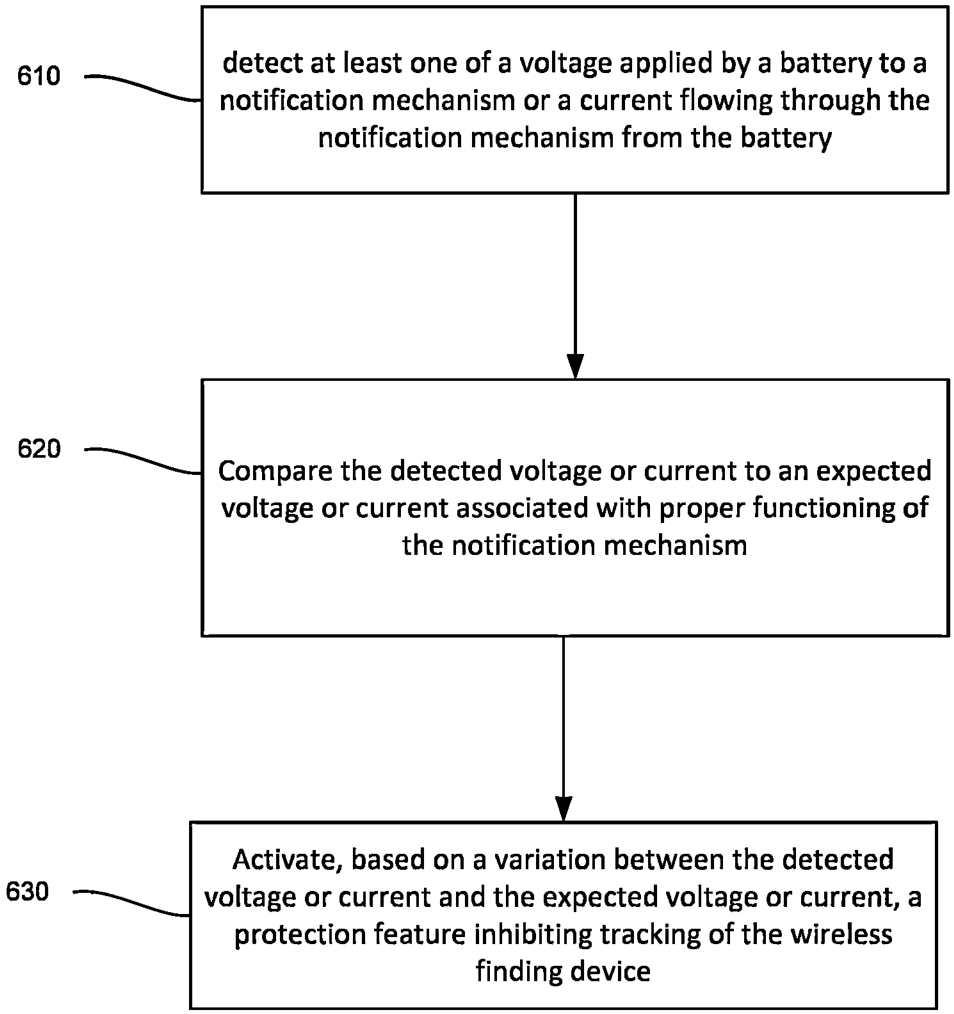
FIG. 6 is a flow diagram of an example method in accordance with aspects of the disclosure.

FIG. 6 illustrates an example method for activating a protection feature inhibiting tracking of a wireless finding device. The following operations do not have to be performed in the precise order described below. Rather, various operations can be handled in a different order or simultaneously, and operations may be added or omitted.

In block 610, a device may detect at least one of a voltage applied by the battery to the notification mechanism or a current flowing through the notification mechanism from the battery. The notification mechanism may be, for example, a speaker, a light, a piezoelectric buzzer, and/or a magnetic buzzer.

In block 620, the device may compare the detected voltage or current to an expected voltage or current associated with proper functioning of the notification mechanism. The change in voltage or current may correspond to tampering with the device.

In block 630, the device may activate, based on a variation between the detected voltage or current and the expected voltage or current, a protection feature inhibiting tracking of the wireless finding device. For example, the protection feature may be a change in the tracking status of the device. The tracking status may change from tracking to degraded or disabled.

In some examples, in response to the detected change in current or voltage, the device may transmit a notification. For example, the device may include a communications interface adapted for direct or indirect communication with a host device. In some examples, in response to activating the protection feature, the communications interface may transmit the notification to the host device. The notification may be, for example, an alert that the notification mechanism has been removed, disconnected, plugged, occluded, tampered with, etc. According to some examples, the notification may be an alert that the tracking status of the device has changed.

According to some examples, the device may be configured to receive a request to locate the device. For example, the device may receive a request from the host device to locate the device. In response to the request, the notification mechanism may output a notification.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wireless finding device comprising:
- a notification mechanism;
- a battery; and
- one or more processors, the one or more processors configured to:
  - detect at least one of a voltage applied by the battery to the notification mechanism or a current flowing through the notification mechanism from the battery;
  - compare the detected voltage or current to an expected voltage or current associated with proper functioning of the notification mechanism; and
  - activate, based on a variation between the detected voltage or current and the expected voltage or current, a protection feature inhibiting tracking of the wireless finding device.

2. The wireless finding device of claim 1, wherein the protection features includes disabling tracking of the wireless finding device or degrading tracking performance of the wireless finding device.

3. The wireless finding device of claim 1, further comprising a communications interface adapted for direct or indirect communication with a host device, wherein in response to activating the protection feature, the communications interface is configured to transmit a notification to the host device.

4. The wireless finding device of claim 3, wherein the notification is an alert that the notification mechanism has been removed, damaged, disconnected, plugged, or occluded.

5. The wireless finding device of claim 3, wherein after transmitting the notification, a tracking status of the wireless finding device cannot be changed.

6. The wireless finding device of claim 3, wherein in response to activating the protection feature, the communications interface is further configured to transmit a request for information to re-enable tracking.

7. The wireless finding device of claim 1, wherein the notification mechanism is at least one of a speaker, a light, a piezoelectric buzzer, haptics actuator, or a magnetic buzzer.

8. The wireless finding device of claim 1, further comprising a memory configured to store an expected voltage or current waveform associated with the proper functioning of the notification mechanism,
- wherein comparing the detected voltage or current to the expected voltage or current includes comparing at least one of a shape or amplitude of a detected voltage or current waveform to the expected voltage or current waveform.

9. A method, comprising:
- detecting, by one or more processors, at least one of a voltage applied by a battery to a notification mechanism in a wireless finding device or a current flowing through the notification mechanism in the wireless finding device from the battery;
- comparing, by the one or more processors, the detected voltage or current to an expected voltage or current associated with proper functioning of the notification mechanism; and
- activating, by the one or more processors based on a variation between the detected voltage or current and the expected voltage or current, a protection feature inhibiting tracking of the wireless finding device.

10. The method of claim 9, wherein the protection features includes disabling tracking of the wireless finding device or degrading tracking performance of the wireless finding device.

11. The method of claim 9, further comprising transmitting, by the one or more processors in response to activating the protection feature, a notification.

12. The method of claim 11, wherein the notification is an alert that the notification mechanism has been removed, damaged, disconnected, plugged, or occluded.

13. The method of claim 11, wherein after transmitting the notification, a tracking status of the wireless finding device cannot be changed.

14. The method of claim 11, further comprising transmitting, by the one or more processors in response to activating the protection feature, a request for information to re-enable tracking.

15. The method of claim 9, wherein the notification mechanism is at least one of a speaker, a light, a piezoelectric buzzer, haptics actuator, or a magnetic buzzer.

16. The method of claim 11, further comprising:

storing, in a memory of the wireless finding device, an expected voltage or current waveform associated with the proper functioning of the notification mechanism, wherein when comparing the detected voltage or current to the expected voltage or current, the method further includes comparing, by the one or more processors, at least one of a shape or amplitude of a detected voltage or current waveform to the expected voltage or current waveform.

17. A non-transitory computer-readable storage medium storing instructions, which when executed by one or more processors, cause the one or more processors to:

detect at least one of a voltage applied by a battery to a notification mechanism of a wireless finding device or a current flowing through the notification mechanism of the wireless finding device from the battery;

compare the detected voltage or current to an expected voltage or current associated with proper functioning of the notification mechanism; and activate, based on a variation between the detected voltage or current and the expected voltage or current, a protection feature inhibiting tracking of the wireless finding device.

18. The non-transitory computer readable medium of claim 17, wherein the protection feature includes disabling tracking of the wireless finding device or degrading tracking performance of the wireless finding device.

19. The non-transitory computer readable medium of claim 17, wherein in response to activating the protection feature, the one or more processors are further configured to transmit a notification to a host device.

20. The non-transitory computer readable medium of claim 19, wherein the notification is an alert that the notification mechanism has been removed, disconnected, plugged, or occluded.

* * * * *